Nov. 23, 1948.                    E. J. LE ROI                    2,454,466
           REGENERATION OF FLUID CATALYSTS WITH COOLING
                   OF FLUE GASES BY WATER INJECTION
                       Filed Feb. 3, 1944
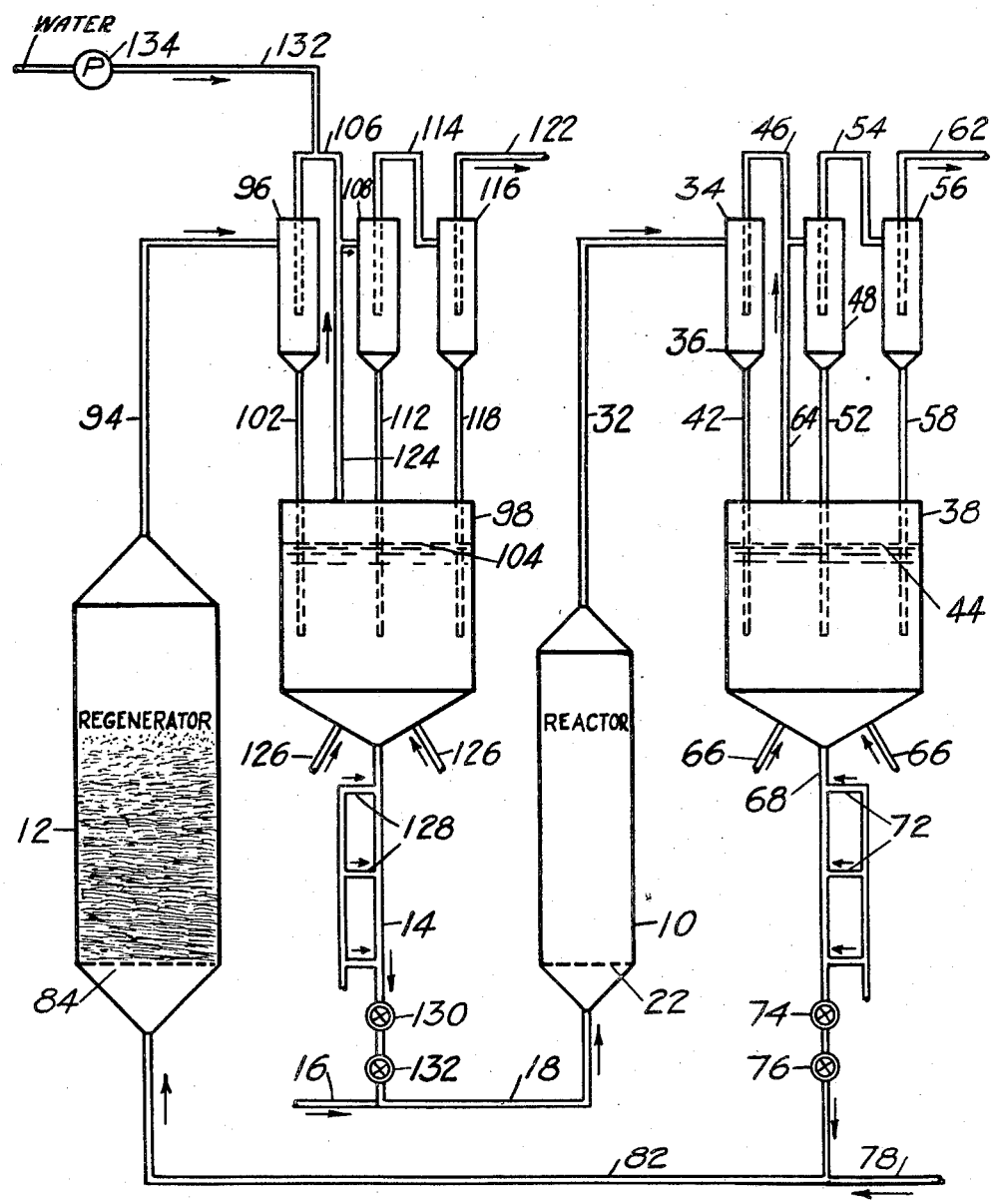
Earl J. LeRoi  Inventor
By P. L. Young  Attorney Patented Nov. 23, 1948

2,454,466

UNITED STATES PATENT OFFICE 2,454,466

REGENERATION OF FLUID CATALYSTS WITH COOLING OF FLUE GASES BY WATER INJECTION

Earl J. Le Roi, Baton Rouge, La., assignor to Standard Oil Development Company, a corporation of Delaware Application February 3, 1944, Serial No. 520,958

8 Claims. (Cl. 252—242)

This invention relates to the regeneration of divided solids by burning with air or other oxygen-containing gas, and more particularly, relates to the regeneration of spent catalyst particles in hydrocarbon conversion operations.

In catalytic organic reactions there are many reactions in which burnable deposits are laid down on the catalyst particles and the catalyst particles have to be regenerated before they are used again. In the catalytic conversion of hydrocarbons, coke or carbonaceous material is deposited on the catalyst particles and these deposits are usually removed by burning with air or other oxygen-containing gas. The burning is exothermic and must be controlled to avoid overheating of the catalyst.

In catalytic conversion processes using powdered catalyst or finely divided catalyst, the divided catalyst is circulated from the reaction zone to the regeneration zone to regenerate the catalyst, and the regenerated catalyst is then returned to the reaction zone. In the regeneration of the spent catalyst, the spent catalyst is mixed with air and the coke or carbonaceous material is burned off. When using powdered catalyst, the catalyst particles are maintained as a fluidized turbulent mixture in the regeneration zone and under certain conditions the mixture comprises a dense lower phase and a dilute upper phase. The velocity of the air passing through the regeneration zone is selected to maintain the bed in fluidized condition during the regeneration. The regeneration gases pass overhead.

During regeneration by burning the gases contain $CO_2$, CO and air, and sometimes hydrocarbons, such as auxiliary fuel added to the regenerator or hydrocarbons not completely removed by stripping. Other combustibles may distill off in the regenerator without being burned completely. The combustion in the dense catalyst mixture does not result in excessively high temperatures because sufficient solids are present to absorb the heat; also, the dense catalyst mixture is maintained at a relatively low temperature so that burning of the combustible gases is incomplete.

In some instances, the temperature of the dense catalyst mixture is below the ignition temperature of some of the combustible gases. However, when an insufficient amount of solids are present, as in the case of the dilute phase, that is, when there is only a small amount of catalyst particles present, combustion may result in undesirable high temperatures. This burning, referred to as "after-burning," may overheat the catalyst and the equipment. With a dilute phase temperature of less than about 1100° F. the after-burning reaction does not occur to any great extent, but if after-burning is once started, the condition is self-sustaining due to the higher reaction rate at the higher temperature.

In one type of process where all the regeneration gases and regenerated catalyst pass overhead from the regeneration zone, after-burning may occur in the line or lines beyond the first cyclone separator after the bulk of the catalyst has been removed from the regeneration gases.

This invention overcomes the above problem by intermittently or substantially continuously injecting a non-combustible vaporizable liquid, e. g. liquid water into the dilute catalyst phase in the line or lines leading from the first cyclone separator.

Where uncontrolled after-burning does occur, this invention also provides for injecting larger amounts of water into the dilute phase in the line leading from the first cyclone separator in addition to that normally introduced as necessary during the regeneration. The vaporization of the liquid water absorbs heat and reduces the temperature in the dilute phase.

In the drawing,

The figure represents one form of apparatus which may be used to carry out the process of this invention.

Referring now to the drawing, the reference character 10 designates a reaction vessel and the reference character 12 designates a regeneration vessel. In the form of the invention shown in the drawing, all of the catalyst passes overhead from the reaction vessel 10 with the vaporous or gaseous reaction products, and all of the regenerated catalyst passes overhead from the regeneration vessel 12 with the regeneration gases.

Regenerated catalyst from standpipe 14 is mixed with heated reactant, such as hydrocarbon vapors, introduced through line 16 and the mixture passed through line 18 below the distribution plate 22 in the reaction vessel 10. The reactant may comprise hydrocarbons which are to be converted or cracked but other reactants may be used. The velocity of the reactant vapors or gases is so selected that the catalyst particles are maintained in a fluidized turbulent condition in the vessel 10.

In the catalytic conversion of hydrocarbons, the hydrocarbon may comprise a hydrocarbon oil, such as gas oil, light gas oil, heavy gas oil, naphtha or other hydrocarbon stock to be converted. The catalyst is a suitable conversion catalyst. In the catalytic cracking of hydrocarbons, the catalyst may be acid-treated bentonite clays or synthetic silica-alumina or synthetic silica-magnesia gels. Other suitable catalysts may be used. When reforming naphthas, reforming catalysts, such as an alumina-molybdena mixture, may be used. The catalyst is preferably in powdered form having a size of about 200 to 400 standard mesh or finer. In the catalytic cracking of hydrocarbons about 0.5 part of catalyst to one of oil to about 30 parts of catalyst to one part of oil by weight may be used. The temperature during cracking is about 800° F. to about 1000° F. Higher or lower temperatures may be used for other reactions.

The fluidized catalyst in the vessel 10, when using powdered synthetic silica alumina gels, has an average density of about 5 lbs./cu. ft. to about 35 lbs./cu. ft. When using powdered acid-treated bentonite clays, about the same densities are obtained.

The reaction products in gaseous form leave the reaction vessel 10 through line 32 together with entrained catalyst. This mixture is passed to a first cyclone separator 34 in which the bulk of the catalyst particles is removed from the gaseous reaction products. The separated catalyst particles collect in the bottom of the separator at 36 and are passed to a hopper 38 by means of dip pipe 42 which dips below the level 44 in the hopper 38. The reaction vapors leave the first cyclone separator through line 46 and are passed to a second cyclone separator 48 where an additional separation of catalyst particles takes place. The separated catalyst particles are returned to the hopper 38 through line 52 which extends below the level 44 in the hopper 38.

The vapors or gases then pass through line 54 to a third cyclone separator 56 and additional catalyst separated out is returned through line 58 to the hopper 38 below the level 44 therein. The vapors or gases substantially free of catalyst particles leave the third cyclone separator 56 through line 62 and are passed to a suitable separation equipment, such as fractionating equipment (not shown), to recover the desired products.

While cyclone separators have been shown, it is to be understood that other forms of separating means may be used. In order to release the pressure from the hopper 38 a balance line 64 is provided which leads from the top of the hopper 38 into the outlet line 46 from the first cyclone separator.

If desired, fluidizing gas may be introduced into the cyclone separators and the dip pipes 42, 52 and 58 for fluidizing the separated catalyst so that it flows more readily. Fluidizing gas is also preferably introduced through lines 66 into the bottom of the hopper 38 for fluidizing the catalyst particles therein. The catalyst particles flow into standpipe 68 provided with fluidizing lines 72 for maintaining the particles in fluidized condition in the standpipes so that they develop a hydrostatic pressure at the base of the standpipe 68. The standpipe 68 is provided with a shut-off valve 74 and a slide control valve 76 for controlling the rate of withdrawal of spent catalyst from the hopper 38.

Regenerating gas, such as air, is introduced through line 78 for admixture with the spent catalyst leaving the bottom of the standpipe 68 and the less dense mixture is passed through line 82 into the bottom of the regeneration vessel 12 below distribution plate 84 therein. In the regeneration vessel 12 the catalyst particles are maintained as a relatively dense mixture. The average concentration of catalyst in the vessel 12 when using powdered synthetic silica alumina gels is about 5 lbs./cu. ft. to 35 lbs./cu. ft.

The regeneration gases together with the regenerated catalyst pass overhead from the regeneration vessel 12 through line 94 to a first cyclone separator 96. In the first cyclone separator 96 most of the catalyst particles are removed from the regeneration gases and the separated catalyst particles are passed to a hopper 98 through dip pipe 102 which extends below the level 104 of catalyst particles in the hopper 98. The regeneration gases leave the first cyclone separator through line 106 and are passed to a second cyclone separator 108 provided with a dip pipe 112 which extends below the level 104 of catalyst in the hopper 98. The regeneration gases leave the second cyclone separator 108 through line 114 and are passed to a third cyclone separator 116 having a dip pipe 118 which extends below the level 104 of catalyst in the hopper 98.

The regeneration gases leave the third cyclone separator through line 122 and may be cooled and then passed to an electrical precipitator (not shown) or other suitable separation equipment for separating or recovering further amounts of catalyst from the regeneration gases. The recovered catalyst is preferably returned to the regenerator.

To prevent the pressure from building up in the hopper 98, balance line 124 is provided which leads from the top of the hopper 98 to the outlet line 106 from the first cyclone separator 96.

The hopper 98 is provided with inlet lines 126 in its lower portion for introducing fluidizing gas to the regenerated catalyst in the hopper. The fluidized regenerated catalyst, which may be at a temperature of about 1000° F. to about 1200° F., flows into the standpipe 14 hereinbefore described. Fluidizing lines 128 are provided for introducing fluidizing gas at spaced intervals along the standpipe 14 to maintain the catalyst particles in fluidized condition. In the dry fluidized condition the regenerated catalyst particles assume some of the characteristics of a liquid and hydrostatic pressure is built up at the base of the standpipe 14 which is utilized for moving the regenerated catalyst particles through the reaction vessel 10 and the rest of the equipment. Standpipe 14 is provided with shut-off valve 130 and control valve 132 for controlling the rate of withdrawal of catalyst from the standpipe.

In the regeneration vessel 12 the regeneration gases contain $CO_2$, $CO$ and oxygen and some combustibles which are not completely burned in the regenerator. While the burning during regeneration takes place in the regenerator 12, the liberated heat is absorbed by the catalyst particles and the temperature is maintained within safe limits. The concentration of the catalyst particles in the regeneration gases passing through line 94 is of the order of 0.7 lb./cu. ft to about 2.5 lbs./cu. ft Within this density range there is not much danger of after-burning due to the burning of $CO$ to $CO_2$ because the catalyst particles take up any heat of regeneration or combustion of CO occurring in line 94.

However, in the line 106, after most of the catalyst particles have been removed, there is only a small amount of catalyst particles present, and with CO and combustibles present, the CO and combustibles in the presence of oxygen may burn rapidly, if the temperature becomes too high, as, for example, 1150° F. and there is danger of undue after-burning. The concentration of the catalyst particles in the regeneration gases in line 106 is about 0.05 lb./cu. ft. to 0.2 lb./cu. ft.

This uncontrolled after-burning results in undesirable high temperatures which may overheat the catalyst and the equipment. At higher temperatures the reaction is more rapid. The temperature of the gases in the line 106 should be maintained below about 1100° F. to control the burning of CO. The temperature of the gases in line 106 normally is about 1000° F. to 1100° F.

In order to reduce the temperature of the regeneration gases in line 106 and to maintain the temperature below about 1075° F., this invention comprises the addition or injection of liquid water into the gases in line 106. This is done by one or more sprays. The water is vaporized and absorbs heat and in this way the temperature of the gases in line 106 is controlled. A sufficient amount of water is introduced to reduce the temperature of the gases in line 106 to about 1000° F. to 1075° F. or below about 1075° F. The liquid water is pumped through line 132 by pump 134. Preferably condensate water is used to minimize or eliminate deposition of salts on the catalyst particles.

While the injection of water is shown in line 106, it may also be introduced into line 114 which leaves the second cyclone separator 108. In most cases, however, this is not necessary.

The water is passed through line 132 and into line 106 as required during the operation of the process. Control means are preferably provided to cut in water if temperature rises above about 1075° but as long as the temperature remains below about 1075° F. no water is introduced. However, if desired, continuous injection of water may be used.

This invention may be used where fouled catalyst or contact particles containing combustible deposits are regenerated by burning with air and it is necessary to limit the temperature during regeneration.

While several embodiments of the invention have been disclosed and conditions of operation have been included, it is to be understood that these are merely by way of illustration and various changes and modifications may be made without departing from the spirit of the invention.

What is claimed is:

1. In a process for regenerating contact particles suspended in a gaseous regenerating medium by burning combustible deposits from the particles wherein a body of contact particles is maintained in a dry fluidized relatively dense condition in a regeneration zone and regeneration gases while leaving said regeneration zone contain entrained contact particles and the regeneration gases also contain combustible material and oxygen, the step of injecting outside said regeneration zone a non-combustible vaporizable liquid into the regeneration gases containing entrained contact particles to reduce the temperature of the regeneration gases and to control after-burning of the combustible gas in the regeneration gases outside said regeneration zone.

2. A process according to claim 1 wherein the vaporizable liquid contains water.

3. In a process for regenerating contact particles by burning combustible material from the particles in a regeneration zone in the presence of oxygen wherein the regeneration gases leaving said regeneration zone contain entrained contact particles and combustible material and oxygen, the step of injecting outside said regeneration zone a vaporizable non-combustible liquid into the regeneration gases after the major portion of the catalyst has been separated therefrom to absorb heat by vaporization of all of said injected liquid in said gases in the presence of said entrained particles and reduce the temperature of the regeneration gases to control after-burning of the combustible material in the regeneration gases and to prevent undue rise in temperature of the regeneration gases outside said regeneration zone.

4. A process according to claim 3 wherein the temperature during regeneration is about 1000° F. to 1150° F. and the temperature of the regeneration gases after introduction of the vaporizable liquid is below the temperature during regeneration.

5. A process according to claim 3 wherein the vaporizable liquid comprises water and the combustible gas in the regeneration gases comprises CO.

6. In a process for regenerating contact particles by burning combustible material from the particles in a regeneration zone in the presence of oxygen wherein the regeneration gases leaving said regeneration zone contain entrained contact particles and combustible gas and oxygen, and all the catalyst particles pass overhead with the regeneration gases and most of the catalyst is separated from the regeneration gases in an initial separation stage before being passed to a second separation stage, the improvement which comprises injecting a vaporizable non-combustible liquid into the regeneration gases immediately after the first separation stage to absorb heat by vaporization and to reduce the temperature of the regeneration gas to control after-burning of the combustible gas in the regeneration gases and to prevent undue rise in temperature of the regeneration gases.

7. In a process of regenerating catalyst particles containing burnable deposits wherein the catalyst particles are in a dense phase and in a dilute phase in which catalyst particles are entrained in regeneration gases, the step of controlling the temperature in the dilute phase which comprises injecting liquid water into the regeneration gases in the dilute phase and out of contact with the dense phase.

8. In a process for regenerating contact particles by burning combustible material from the particles in a regeneration zone in the presence of oxygen wherein the regeneration gases leaving said regeneration zone contain entrained contact particles and combustible material and oxygen, the step of injecting a vaporizable non-combustible liquid into the regeneration gases after the major portion of the catalyst has been separated therefrom to absorb heat by vaporization of all of said injected liquid in said gases in the presence of said entrained particles and reduce the temperature of the regeneration gases to control after-burning of the combustible material in the regeneration gases and to prevent undue rise in temperature of the regeneration gases.

EARL J. LE ROI.

REFERENCES CITED

The following references are of record in the file of this patent:

UNITED STATES PATENTS

| Number | Name | Date |
|---|---|---|
| 1,446,857 | Peiter | Feb. 27, 1923 |
| 2,127,009 | Pyzel | Aug. 16, 1938 |
| 2,309,034 | Barr | Jan. 19, 1943 |
| 2,311,564 | Munday | Feb. 16, 1943 |
| 2,311,978 | Conn | Feb. 23, 1943 |
| 2,320,562 | Bransky | June 1, 1943 |
| 2,356,680 | Marancik et al. | Aug. 22, 1944 |
| 2,367,351 | Hemminger | Jan. 16, 1945 |
| 2,374,660 | Belchetz et al. | May 1, 1945 |
| 2,379,734 | Martin | July 3, 1945 |
| 2,393,839 | Thomas et al. | Jan. 29, 1946 |

FOREIGN PATENTS

| Number | Country | Date |
|---|---|---|
| 544,063 | Great Britain | Mar. 25, 1942 |